(12) United States Patent
Veligdan et al.

(10) Patent No.: US 6,487,350 B1
(45) Date of Patent: Nov. 26, 2002

(54) MULTI-CLAD BLACK DISPLAY PANEL

(75) Inventors: James T. Veligdan, Manorville, NY (US); Cyrus Biscardi, Bellport, NY (US); Calvin Brewster, North Patchogue, NY (US)

(73) Assignee: Brookhaven Science Associates, Upton, NY (US)

( * ) Notice: Subject to any disclaimer, the term of this patent is extended or adjusted under 35 U.S.C. 154(b) by 0 days.

(21) Appl. No.: 09/335,660

(22) Filed: Jun. 18, 1999

Related U.S. Application Data

(63) Continuation-in-part of application No. 09/116,230, filed on Jul. 16, 1998, now abandoned.

(51) Int. Cl.[7] .................................................. G02B 6/06
(52) U.S. Cl. ........................ 385/120; 385/131; 385/901
(58) Field of Search ........................ 385/116–120, 901, 385/131; 362/551, 554; 348/804

(56) References Cited

U.S. PATENT DOCUMENTS

| | | | | |
|---|---|---|---|---|
| 3,253,500 A | * | 5/1966 | Hicks, Jr. .................... 385/120 |
| 3,797,910 A | * | 3/1974 | Westwig | |
| 4,344,668 A | * | 8/1982 | Gunther et al. ............. 385/120 |
| 4,919,513 A | * | 4/1990 | Nakakuki et al. | |
| 5,455,882 A | * | 10/1995 | Veligdan .................... 385/116 |
| 5,625,736 A | * | 4/1997 | Veligdan .................... 385/120 |
| 5,642,449 A | * | 6/1997 | Phillips ...................... 385/120 |
| 5,684,905 A | * | 11/1997 | Sugawara et al. .......... 385/120 |
| 6,038,360 A | * | 3/2000 | Sugawara .................. 385/120 |

* cited by examiner

*Primary Examiner*—Hemang Sanghavi
(74) *Attorney, Agent, or Firm*—Reed Smith LLP; William J. McNichol, Jr.; Matthew J. Esserman

(57) ABSTRACT

A multi-clad black display panel, and a method of making a multi-clad black display panel, are disclosed, wherein a plurality of waveguides, each of which includes a light-transmissive core placed between an opposing pair of transparent cladding layers and a black layer disposed between transparent cladding layers, are stacked together and sawed at an angle to produce a wedge-shaped optical panel having an inlet face and an outlet face.

41 Claims, 2 Drawing Sheets

MULTI-CLAD BLACK DISPLAY PANEL

CROSS REFERENCE TO RELATED APPLICATIONS

This application is a continuation-in-part of U.S patent application Ser. No. 09/116,230, filed Jul. 16, 1998 now abandoned, and entitled "MULTI-CLAD BLACK OPTIC DISPLAY".

STATEMENT REGARDING FEDERALLY SPONSORED RESEARCH OR DEVELOPMENT

This invention was made with Government support under contract number DE-AC02-98CH10886, awarded by the U.S. Department of Energy. The Government has certain rights in the invention.

BACKGROUND OF THE INVENTION

1. Field of the Invention

The present invention is directed generally to a planar optical display, and, more particularly, to a multi-clad black display panel and a method of making a multi-clad black display panel.

2. Description of the Background

Video display screens typically use cathode ray tubes (CRTs) for projecting an image onto the outlet face of the screen. A typical screen of this type has a width to height ratio of 4 with 525 vertical lines of resolution. An electron beam must be scanned both horizontally and vertically on the screen to form a number of pixels, which collectively form the image. Conventional cathode ray tubes have a practical limit in size and are relatively deep to accommodate the required electron gun. Larger screen televisions are available which typically include various forms of image projection for increasing the screen image size. However, such screens may experience limited viewing angle, limited resolution, decreased brightness, and decreased contrast. In order to improve brightness, more light must be incident to the viewer and less absorbed within the unit. In order to improve contrast, it is necessary that the viewing screen be as black as possible. It is not currently possible for direct view CRT's to be black because they utilize phosphors for forming the viewing image, and the phosphors are not black.

In U.S. Pat. No. 5,625,736, an optical panel having a plurality of stacked waveguides is rendered black using a black cladding layer between transparent cores of the waveguides. The cladding layers disclosed therein have a lower index of refraction than the waveguide cores for effectuating substantial internal reflection of the image light channeled through the cores, and thereby improve contrast. However, the dual function black cladding layer, because the layer is black in color and thus places black particles in direct contact with the core, creates a small amount of light absorption, thereby reducing the amount of total internal reflection. The maximum brightness of the image displayed on the screen is thereby reduced.

Therefore, the need exists for a display panel which provides substantially total internal reflection to improve brightness, while also providing a black screen to improve viewing contrast.

BRIEF SUMMARY OF THE INVENTION

The present invention is directed to an optical display panel which provides improved viewing contrast and brightness by increasing the black area visible to a viewer, while minimizing light absorption within the panel by minimizing the exposure of black particles directly to the light. The multi-clad black display panel includes an inlet face at one end for receiving light, and an outlet screen at an opposite end for displaying the light. The inlet face is defined at one end of a transparent body formed by a plurality of waveguides, and the outlet screen is defined at an opposite end of the body and may be disposed obliquely with the inlet face. Each of the waveguides includes a core for channeling light, and the core is placed between an opposing pair of transparent cladding layers. The waveguides also have a black layer disposed between transparent cladding layers.

The present invention is also directed to a method of making a multi-clad black display panel. The method includes stacking a plurality of glass sheets, each having attached thereto opposed transparent cladding layers, with a black layer disposed between each sheet, and placing the stack against a saw and cutting the stack, using the saw, at two opposite ends at an angle to form a wedge-shaped panel having an inlet face and an outlet face.

The multi-clad black display panel solves problems experienced in the prior art by providing substantially total internal reflection, thereby improving screen brightness, while also providing a black screen to improve viewing contrast.

BRIEF DESCRIPTION OF THE SEVERAL VIEWS OF THE DRAWINGS

For the present invention to be clearly understood and readily practiced, the present invention will be described in conjunction with the following figures, wherein.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, many other elements found in a typical optical display panel. Those of ordinary skill in the art will recognize that other elements are desirable and/or required in order to implement the present invention. However, because such elements are well known in the art, and because they do not facilitate a better understanding of the present invention, a discussion of such elements is not provided herein.

Figure 1:
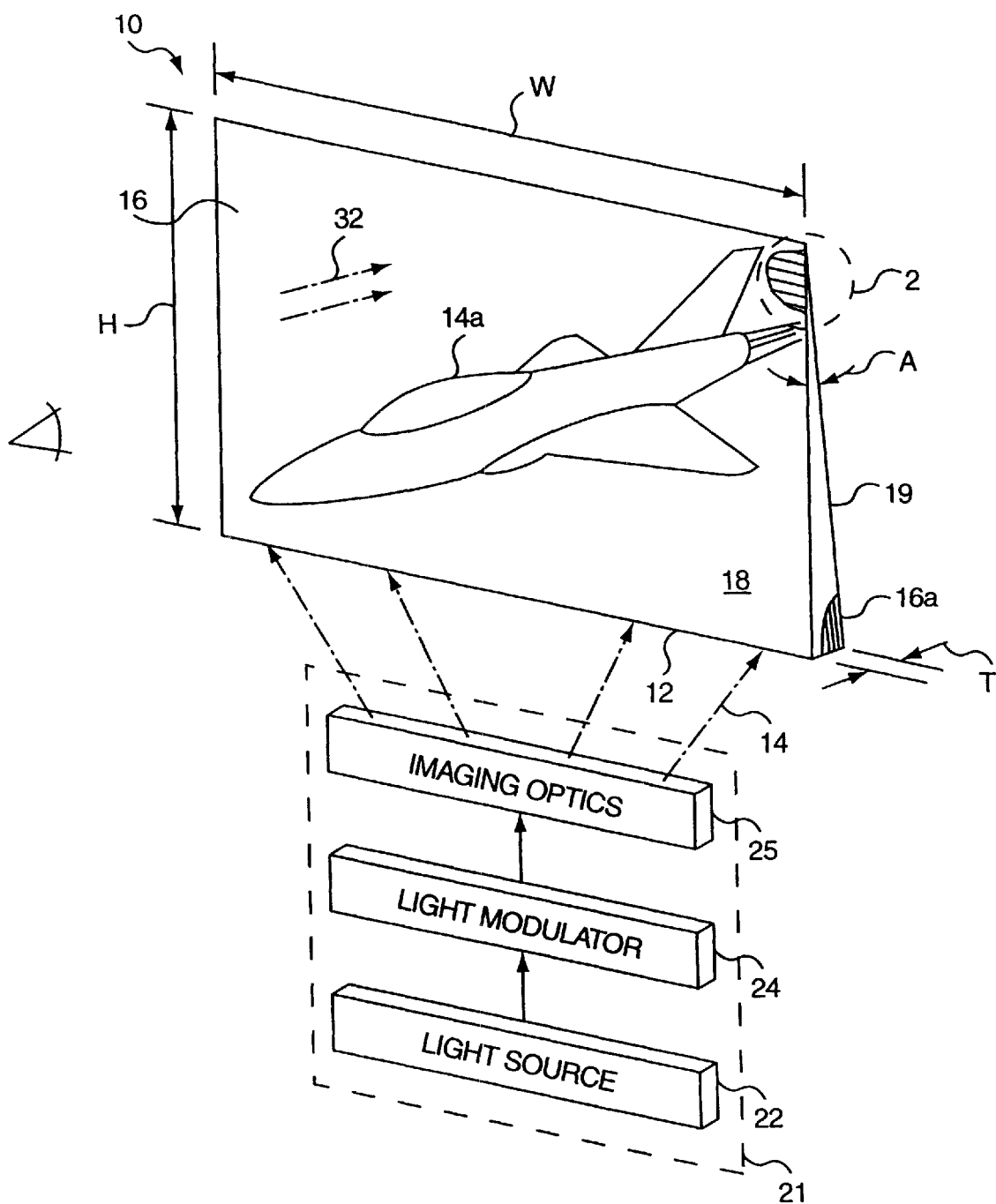
FIG. 1 is an isometric view schematic illustrating a display panel.

FIG. 1 is an isometric view schematic illustrating a display panel 10. The display panel 10 may include a plurality of stacked optical waveguides 16a, an outlet face 16 at one end of a body 18 formed by the plurality of stacked waveguides 16a, an inlet face 12 at a second end of the body 18, and a light generator 21.

The body 18 is preferably solid and homogeneous, and receives light 14 along the surface of the inlet face 12. The light 14 is passed through the body 18 after entering the inlet face 12. In a preferred embodiment of the present invention, the body 18 is formed of the length, height, and width of the plurality of stacked waveguides 16a.

The plurality of stacked waveguides 16a forms the body 18 of the panel 10, forms at one end of the stack 16a the inlet face 12, and at a second end the outlet face 16. The waveguides 16a may be formed of any material known in the art to be suitable for passing electromagnetic waves therethrough, such as, but not limited to, plastics, or glass. The preferred embodiment of the present invention is implemented using individual glass sheets, which are typically approximately 0.004" thick, and which may be of a manageable length and width. The glass used may be of a type such as, but not limited to, glass type BK-7, or may be a suitable plastic laminate, such as Lexan®, commercially available from the General Electric Company®.

The inlet face 12 and outlet face 16 are formed by the plurality of waveguides 16a, wherein one end of each waveguide 16a forms an inlet for that waveguide, and wherein the opposite end of each waveguide 16a forms an outlet for that waveguide 16a. Each waveguide 16a extends horizontally, and the plurality of stacked waveguides 16a extends vertically. The light 14 may be displayed on the outlet face in a form such as, but not limited to, a video image 14a. The focusing length of the panel 10 may increase from the outlet face 16 to the back face 19 where the panel 10 is formed in a wedge shape, which may result in an image 14a having slightly reduced resolution. A panel 10 having reduced resolution may be used in alternate applications, rather than video display screen applications. For example, the panel 10 may be used as an illuminated button whose screen requires a simple image communicated to the viewer.

The outlet face 16 is formed by the plurality of stacked optical waveguides 16a. The outlet face 16 is at one end of the body 18, and is disposed obliquely with the inlet face 12. The inlet face 12 is generally defined as the bottom of the body 18, and the outlet face 16 is defined as the front of the body 18. The outlet face 16 may be generally perpendicular to the inlet face 12, forming a triangular wedge having an acute face angle A between the inlet face 16 of the body 18 and the back end 19 of the body 18. The acute face angle A may be in the range of about 1 to about 10 degrees, and is preferably about 5 degrees, with the panel 10 increasing in thickness from a minimum at the top of the body 18, to a maximum thickness at the bottom of the body 18. The maximum thickness may be chosen as small as is practicable in a given application. The panel 10 has a height from the top to the bottom of the outlet face 16, and a width from the left to the right of the outlet face 16. The width and height may be selected to produce width to height aspect ratios of 4:3 or 16:9, for example, for use in a typical television application. In an exemplary embodiment of the present invention, a maximum thickness in the range of about 5.0 to 8.0 cm may be chosen, in conduction with a height of 100 cm and a width of 133 cm.

The light generator 21 generates light 14 and passes the light to inlet face 12. The light generator may include a light source 22, a light modulator 24, and imaging optics 25. The light 14 may be initially generated by the light source 22. The light source 22 may be, for example, a bright incandescent bulb, a laser, an arc lamp, or an LED. The light 14 from the source 22 may then be modulated by the modulator 24 for defining individual picture elements, known in the art as pixels. The modulator 24 may take a form known in the art, such as, but not limited to, a liquid crystal display (LCD), a Digital Micromirror Device (DMD), a raster scanner, a vector scanner, a CRT, or an FED. The imaging optics 25 may include light folding mirrors or lenses. The imaging optics 25 are optically aligned between the inlet face 12 and the light modulator 24 for compressing or expanding and focusing the light 14 as required to fit the inlet face 12. The light 14, after entry into the inlet face 12, travels through the panel body 18 to the outlet face 16. The light 14 is projected from the image optics 25 over the inlet face 12, and is thus directed generally vertically upward for projection from the outlet face 16.

The display panel 10 of the present invention may include at least one light redirective element connected at the outlet face 16 in order to redirect the light 14, which is incident in a direction generally vertically upward from the inlet face 12, to a direction perpendicular to the outlet face 16. The light redirective element may be, but is not limited to, a mirrored serration, a plurality of serrations, a holographic coating, a lens or series of lenses, a micro-lens or series of micro-lenses, or a Fresnel prism.

Figure 2:
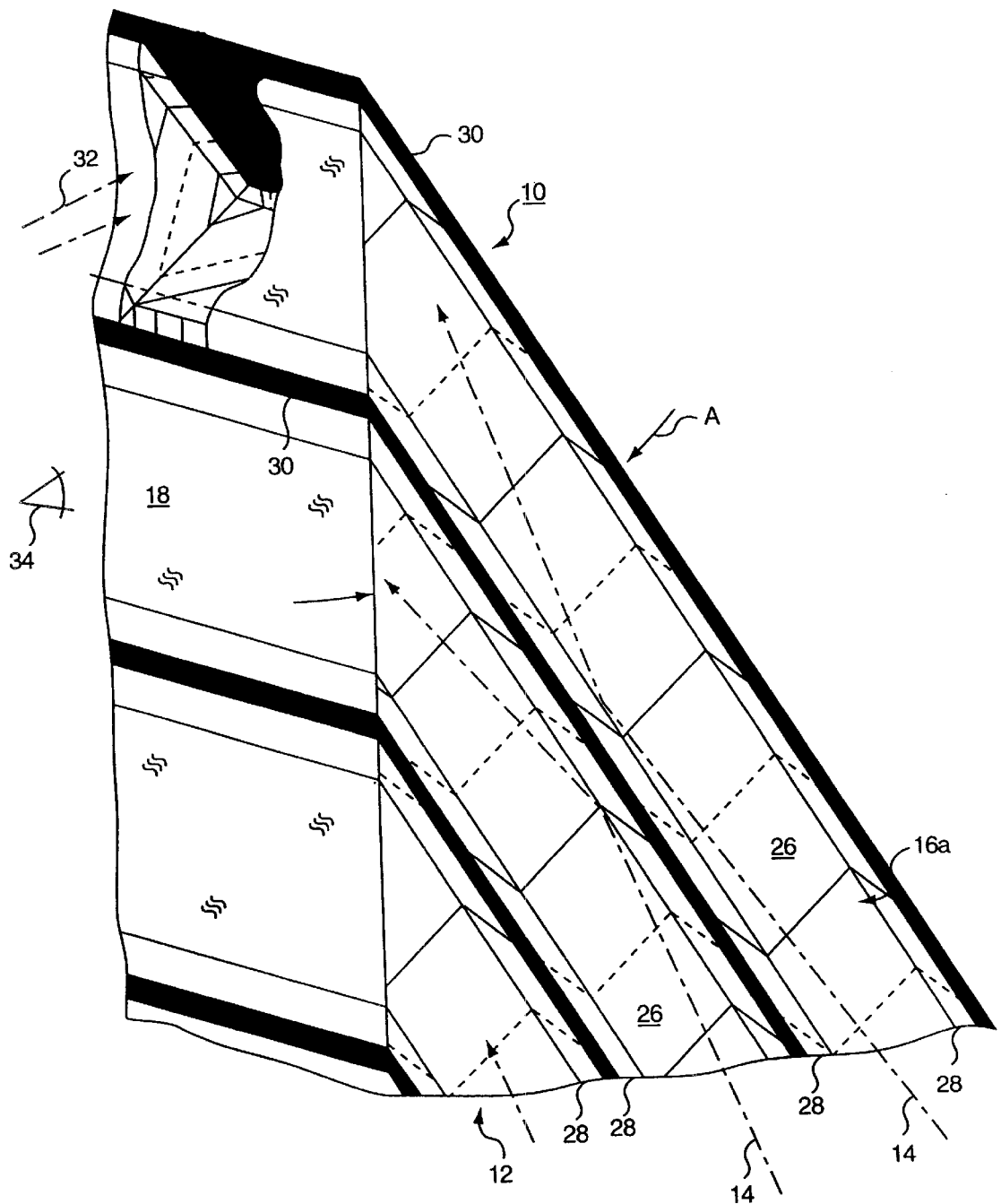
FIG. 2 is an isometric view illustrating a vertical cross section of a multi-clad black display panel.

FIG. 2 is an isometric view illustrating a vertical cross section of a multi-clad black display panel 10. The multi-clad black display panel 10 is a preferred embodiment of the panel 10 of FIG. 1. The multi-clad black display panel includes a body 18 formed of a plurality of stacked optical waveguides 16a, extending from the inlet face 12 to the outlet face 16, for independently channeling and confining the light 14 therethrough.

The waveguides 16a are in the form of sheets or ribbons extending the full width of the outlet face 16 and are stacked to collectively form at their upper ends the height of the outlet face 16. The waveguides 16a are disposed along their longitudinal light transmitting axes at an acute face angle A with the outlet face, which angle is defined by the acutely beveled upper ends of the waveguides 16a disposed coplanar in the vertical plane. The number of waveguides 16a may be selected for providing a corresponding vertical resolution of the outlet face 16. For example, 525 of the waveguides 16a may be stacked to produce 525 lines of vertical resolution in the outlet face 16. Since the waveguides 16a extend the full width of the outlet face 16, horizontal resolution is controlled by horizontal modulation of the image light 14.

Each of the plurality of waveguides includes a central core 26 for channeling the image light 14 through the waveguides, and each core 26 is disposed between an opposing pair of cladding layers 28. In a preferred embodiment of the present invention, the cladding layers 28 extend completely from the inlet face 12 to the outlet face 16 along the entire width of the outlet face 16. A black layer 30 is disposed between adjoining cladding layers 28 for absorbing ambient light 32 at the outlet face 16. The term black is used herein to encompass not only pure black color, but additionally, any functionally comparable dark color suitable for use in the present invention, such as dark blue. The black layer 30 is only necessary within the viewable region of the outlet face, but, in a preferred embodiment of the present invention, the black layer 30 extends completely from the inlet face 12 to the outlet face 16 along the entire width of the outlet face 16.

Each central core 26 has a first index of refraction. The cladding layers 28 have a second index of refraction, lower than that of the central core 26, for ensuring total internal reflection of the image light 14 as it travels from the inlet face 12 to the outlet face 16. The core is preferably bidirectional. In a preferred embodiment of the present invention, the cladding layers 28 are transparent in order to effectuate total internal reflection of the image light 14, and thereby maximize the brightness of the light 14 at the outlet face 16. The black layers 30 may have any index of refraction. Due to the positioning of the waveguides 16a at the acute face angle A with the outlet face, the black layers 30 are exposed at the outlet face 16 and are viewable at the outlet face 16, thus absorbing ambient light 32 and thereby increasing viewing contrast of the outlet face 16. The black layers 30 are also viewable at the outlet face 16 through the transparent central cores 26 and transparent cladding layers 28, thereby further absorbing ambient light 32 and increasing viewing contrast. Because the black layers 30 are separate from the cladding layers, the black layer does not contact the glass directly, thus preventing the absorption of any portion of the light due to black particle. Therefore, because only lower refraction index particles are in direct contact with the glass, internal reflection is substantially improved.

The plurality of stacked waveguides 16a may be formed by several methods. A plurality of glass sheets, as described above, may be used as the central cores 26, and may be individually coated with, or dipped within, a clear substance having an index of refraction lower than that of the glass, such as, but not limited to, polyurethane, clear coat, silicons, cyanoacreylates, and low index refraction epoxys, thereby forming a coated glass sheet. This clear substance is the opposed cladding layers 28. Alternatively, two pieces of polymethylmethacrylate (plexiglass) could be fastened to each face of the glass sheet by methods known in the art, thereby forming the coated glass sheet. A first coated glass sheet is then placed in a trough sized slightly larger than the first coated glass sheet. The trough may then be filled with a thermally curing black epoxy. The black epoxy need not possess the properties of a suitable cladding layer. After filling of the trough, coated glass sheets are repeatedly stacked, and a layer of epoxy forms between each coated glass sheet, thereby forming the black layers 30. The sheets are preferably stacked at a slight angle, which angle must be less than 90 degrees. The stacking is preferably repeated until between approximately 500 and 800 sheets have been stacked. Uniform pressure may then be applied to the stack, thereby causing the epoxy to flow to a generally uniform level between coated glass sheets. The stack may then be baked to cure at 80 degrees Celsius for such time as is necessary to cure the epoxy, and the stack is then allowed to cool slowly in order to prevent cracking of the glass. After curing, the stack is placed against a saw, such as, but not limited to, a diamond saw, and cut at two opposite ends at an angle to form a wedge-shaped panel 10 having an inlet face 12 and an outlet face 16. The inlet face 12 and the outlet face 16 may be cut as planar or curved as desired. The cut portions of the panel 10 may then be polished with a diamond polisher to remove any saw marks. For example, the lower end of the stack may be polished for receiving the image light 14 over the inlet face 12. Furthermore, the exposed ends of the central cores 26 at the outlet face 16 may be frosted to diffuse the image light 14.

In a second embodiment of the present invention, the coated glass sheets may be coated with a black substance, such as spray paint. The coated blackened glass sheets may then be stacked within a trough containing clear or black epoxy, followed by the steps recited hereinabove.

In another embodiment of the present invention, the coated blackened glass sheets may be individually fastened using glue or epoxy, without the use of a filled trough or the equivalent, followed by the steps recited hereinabove.

In another embodiment of the present invention, the coated glass sheets preferably have a width in the range between 0.5" and 1.0", and are of a manageable length, such as 12". The coated glass sheets are stacked, but need not be stacked at an angle, and a layer of black UV adhesive is placed between each sheet. Ultraviolet radiation is then used to cure each adhesive layer, and the stack may then be cut and/or polished and discussed hereinabove. The adhesive layers are preferably approximately 0.0002" in depth.

In another embodiment of the present invention, the black layer 30 may be a black plastic laminate, or a black polyethylene, bonded between respective pairs of cladding layers 28 using glue or black or clear epoxy, which bonded stack may then be cut and/or polished as described hereinabove.

In another embodiment of the present invention, both the clear substance and the black layer could be formed of a suitable substance and placed, in turn, on the glass core using sputtering techniques known in the art, or deposition techniques known in the art. The steps are then followed as recited above.

Those of ordinary skill in the art will recognize that many modifications and variations of the present invention may be implemented. For example, different steps of the various methods of forming the multi-clad black display panel may be interchangeably combined, while still producing a substantively similar panel. The foregoing description and the following claims are intended to cover all such modifications and variations.

What is claimed is:

1. An optical display panel for displaying a projected image, said optical display panel comprising:

a plurality of stacked planar optical waveguides, wherein each waveguide has a receiving end and an outlet end, which plurality of receiving ends form an inlet face and which plurality of outlet ends form an outlet face, wherein each waveguide receives image light at the inlet face, and outlets the image light at the outlet face, wherein each waveguide is formed of a core between an opposing pair of cladding layers, and wherein each of said cladding layers extends from the inlet face to the outlet face; and a black layer disposed between adjoining cladding layers, wherein each of said black layers extends from the inlet face to the outlet face.

2. The optical display panel of claim 1, wherein the image light is displayed at the outlet face as a video image.

3. The optical display panel of claim 1, wherein the image light is displayed at the outlet face as an illuminated button.

4. The optical display panel of claim 1, wherein said plurality of waveguides are stacked at an angle, thereby disposing the outlet face obliquely with the inlet face.

5. The optical display panel of claim 4, wherein the outlet face is disposed perpendicularly to the inlet face, thereby forming the panel into a triangular wedge shape.

6. The optical display panel of claim 5, wherein the triangular wedge has an angle in the range of about 1 to 10 degrees.

7. The optical display panel of claim 6, wherein the triangular wedge has an angle in the range of about 5 degrees.

8. The optical display panel of claim 1, further comprising a light generator which generates the image light.

9. The optical display panel of claim 8, wherein said light generator includes:

a light source;

a light modulator; and imaging optics.

10. The optical display panel of claim 9, wherein said light source is chosen from the group consisting of an incandescent bulb, a laser, an LED, and an arc lamp.

11. The optical display panel of claim 9, wherein the image light from said light source is modulated by said light modulator to define pixels.

12. The optical display panel of claim 11, wherein horizontal resolution at the outlet face is controlled by modulation of the image light from said light source.

13. The optical display panel of claim 11, wherein said light modulator is chosen from the group consisting of a liquid crystal display, a digital micromirror device, a vector scanner, a raster scanner, an FED, and a CRT.

14. The optical display panel of claim 9, wherein said imaging optics include at least one light folding mirror and at least one lens.

15. The optical display panel of claim 9, wherein said imaging optics are optically aligned between the inlet face and said light modulator for compressing, expanding, and focusing the light to fit the inlet face.

16. The optical display panel of claim 1, wherein said black layer is disposed at an angle in order to absorb ambient light.

17. The optical display panel of claim 16, wherein each of said black layers is exposed at the opposed end which outlets the image light.

18. The optical display panel of claim 1, wherein each of said waveguides is bi-directional.

19. The optical display panel of claim 1, wherein the core is laminated between the cladding layers.

20. The optical display panel of claim 1, wherein said core has a first index of refraction and wherein said cladding layer has a second index of refraction which is lower than the first index of refraction.

21. The optical display panel of claim 1, wherein said core is transparent.

22. The optical display panel of claim 21, wherein each of said cladding layers is transparent.

23. The optical display panel of claim 1, wherein said outlet face is frosted.

24. The optical display panel of claim 1, wherein each of said cores is a glass sheet.

25. The optical display panel of claim 24, wherein the glass sheet is about 0.004" in thickness.

26. The optical display panel of claim 24, wherein the glass sheet is of type BK-7.

27. The optical display panel of claim 1, wherein each of said cores is a plastic laminate.

28. The optical display panel of claim 27, wherein the plastic laminate is Lexan®.

29. The optical display panel of claim 1, wherein each of said cores is plexiglass.

30. The optical display panel of claim 1, wherein each of said cladding layers is a clear coat.

31. The optical display panel of claim 1, wherein each of said cladding layers is formed of polyurethane.

32. The optical display panel of claim 1, wherein each of said cladding layers is a polymethylmethacrylate sheet.

33. The optical display panel of claim 1, wherein each of said black layers is a plastic laminate.

34. The optical display panel of claim 33, wherein the plastic laminate is bonded between adjoining cladding layers.

35. The optical display panel of claim 1, further comprising at least one light redirection element connected at the outlet face.

36. The optical display panel of claim 35, wherein said light redirection element is chosen from the group consisting of a holographic coating, a series of lenses, a series of mirrors, a series of micro-lenses, a plurality of serrations, and a Fresnel prism.

37. The optical display panel of claim 1, wherein each waveguide extends horizontally, and the plurality of stacked waveguides extends vertically.

38. The optical display panel of claim 37, wherein the panel has a width along a horizontal of the outlet face, a height along a vertical of the outlet face, a top, and a bottom along the inlet face, which bottom has a depth from the outlet face to the back face.

39. The optical display panel of claim 38, wherein the width to the height is an aspect ratio of 4:3.

40. The optical display panel of claim 38, wherein the width to the height is an aspect ratio of 16:9.

41. The optical display panel of claim 38, wherein the depth of the bottom is in the range of about 5.0 to 8.0 cm, and wherein the height of the panel is 100 cm and the width of the panel is 133 cm.

* * * * *